United States Patent [19]

Fischer

[11] 4,326,437

[45] Apr. 27, 1982

[54] INDEXABLE CUTTING TOOL

[76] Inventor: Fred W. Fischer, 1450 Silver Bell Rd., Rochester, Mich. 48063

[21] Appl. No.: 173,026

[22] Filed: Jul. 28, 1980

[51] Int. Cl.³ .................... B23B 29/00; B26D 1/12
[52] U.S. Cl. ................................ 82/36 A; 407/64; 407/90
[58] Field of Search ............... 82/36 A; 407/64, 90, 407/91

[56] References Cited

U.S. PATENT DOCUMENTS

| | | | |
|---|---|---|---|
| 632,678 | 9/1899 | Dock | 407/64 |
| 652,643 | 6/1900 | Rivett | 82/36 A |
| 897,625 | 9/1908 | Keel | 407/64 |
| 1,227,486 | 5/1917 | Newman et al. | 82/36 A |
| 1,299,712 | 4/1919 | Halstead | 82/36 A |
| 1,342,746 | 6/1920 | Halstead | 82/36 A |
| 1,740,604 | 12/1929 | Kienzl | 407/64 |
| 3,182,534 | 5/1965 | Hoffmann | 407/64 |
| 3,288,005 | 11/1966 | Tringale et al. | 82/36 A |

FOREIGN PATENT DOCUMENTS

| | | | |
|---|---|---|---|
| 896903 | 11/1953 | Fed. Rep. of Germany | 82/36 A |
| 1200482 | 6/1959 | France | 82/36 A |
| 403444 | 6/1966 | Switzerland | 82/36 A |

Primary Examiner—Harrison L. Hinson
Attorney, Agent, or Firm—McGlynn and Milton

[57] ABSTRACT

A cutting tool assembly including a tool holder for supporting a cutting tool having a tool body and a plurality of substantially identical cutting edges extending radially from the tool body and being substantially equally circumferentially spaced thereabout. The cutting tool is pivotally mounted on the tool holder about a first pivot axis for pivotal indexing movement of the tool body relative to the tool holder to successively dispose a selected cutting edge in a predetermined cutting position relative to the tool holder. The assembly further includes a latch pivotally mounted about a second pivot axis spaced from the first pivot axis on the tool holder and having a latched position operatively engageable with the tool body to hold the selected cutting edge in a predetermined cutting position and an unlatched position permitting pivotal indexable movement of the cutting tool to dispose another of the cutting edges in the predetermined cutting position. A spring operatively interconnects the tool holder with the latch to continuously urge the latter toward the latched position thereof while permitting movement of the latch to the unlatched position thereof while indexing the cutting tool.

5 Claims, 3 Drawing Figures

INDEXABLE CUTTING TOOL

BACKGROUND OF THE INVENTION

(1) Field of the Invention

The instant invention relates to cutting tool assemblies to be mounted on a cutting machine (such as a lathe) wherein the cutting tool assembly includes a cutting tool having a plurality of cutting edges wherein a single cutting edge is to be used on a given work piece at a given time.

(2) Description of the Prior Art

Prior art indexable cutting tool assemblies have been constructed such that a rotatable indexable cutting tool has a plurality of cutting edges extending radially therefrom and is mounted on a cutting tool holder. The cutting tool holder provides a means for rotating the cutting tool and other means for locking the tool in a desired position and a third means for indexing the cutting edge of the tool in a specific position relative to the tool holder. Problems arise when the cutting tool must be moved rectilinearly to allow for rotation of the cutting tool to position an alternative cutting edge. Furthermore, these assemblies are generally complex and, therefore, expensive to purchase and maintain.

The instant invention provides a cutting tool assembly having a simple construction wherein a single latch secures the cutting tool in a preferred cutting position and indexes the cutting edge. Furthermore, the cutting tool rotates about a single stationary axis since there is no need for rectilinear movement of the cutting tool as in prior art assemblies.

SUMMARY OF THE INVENTION

The instant invention provides a cutting tool assembly including a tool holder and a cutting tool mounted thereon. The cutting tool includes a tool body having a plurality of substantially identical cutting edges extending radially from the tool body and being substantially equally circumferentially spaced thereabout. A mounting member pivotally mounts the tool body of the cutting tool on the tool holder about a first pivot axis for pivotal indexing movement of the tool body relative to the tool holder to successively dispose a selected one of the cutting edges in a predetermined cutting position relative to the tool holder. A latch is pivotally mounted on the tool holder about a second pivot axis spaced from the pivot axis and has a latched position operatively engageable with the tool body to hold the selected one of the cutting edges in the predetermined cutting position and an unlatched position allowing pivotal indexable movement of the tool body to dispose another of the cutting edges in the predetermined cutting position. A yieldable spring member operatively interconnects the tool holder with the latch to continuously urge the latter toward the latched position thereof while permitting movement of the latch to the unlatched position thereof while indexing the tool body.

PRIOR ART STATEMENT

The U.S. Pat. Nos. 632,678 to Dock issued Sept. 5, 1899; 1,299,712 to Halstead issued Apr. 8, 1919; and 1,342,745 to Halstead issued June 8, 1920 are examples of prior art patents teaching cutting tool assemblies including cutting tools having a plurality of cutting blades extending therefrom rotatably mounted on a tool holder. The assemblies include a handle member for rotating the cutting blade. In each of the aforementioned patents the handle member may include pawls for engaging the teeth or cutting surface of the cutting tool to rotate the cutting tool; however, in each of the three aforementioned patents the handle member does not function to lock the cutting member into place as does the latch of the subject invention, nor does the handle function to index a cutting blade to a predetermined position.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF PREFERRED EMBODIMENT

Figure 1:
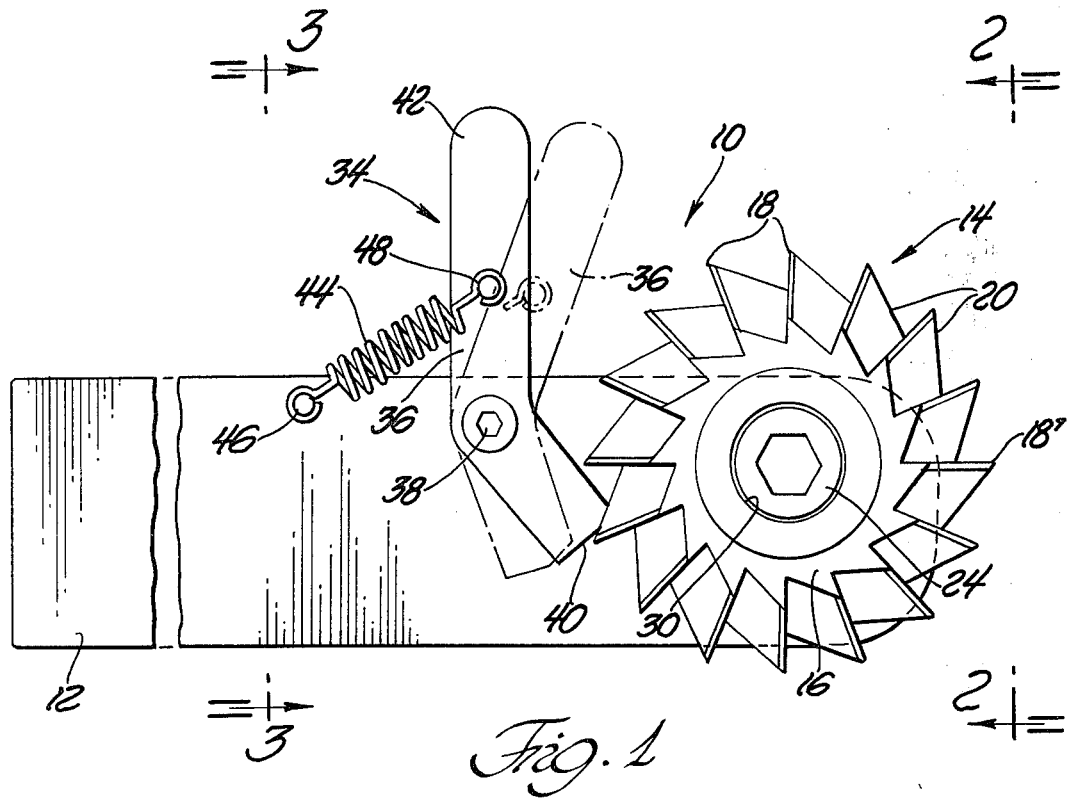
FIG. 1 is a side view of the instant invention.

Referring now to the drawings, a preferred embodiment of a cutting tool assembly constructed in accordance with the present invention is indicated generally at 10 and comprises a tool holder 12 adapted to be suitably fixedly mounted on a cutting machine such as a lathe. The tool holder 12 is conventional in construction and, as indicated in the drawings, may consist of an elongate body generally rectangular in cross section.

A cutting tool is indicated generally at 14 and comprises a tool body 16 having a plurality of substantially identical cutting edges 18 extending radially from the body 16. The cutting edges 18 are substantially equally circumferentially spaced about the tool body 16. Each of the cutting edges 18 has a back face portion 20 as illustrated particularly in FIG. 1. The cutting tool 14, in and of itself, is of conventional construction, and is removably mounted on the tool holder 12 in a manner to be described hereinafter for the purpose of resharpening the cutting edges thereof, or may be simply disposed of once the cutting edges 18 are no longer of use.

A mounting means is indicated generally at 22 for removably pivotally mounting the tool body 16 on the tool holder 12 about a first pivot axis for pivotal indexable movement of the tool body 16 and, hence, the cutting edges 18 relative to the tool holder 12 to successively sequentially index and dispose a selected one of the cutting edges 18 in a predetermined cutting position relative to the tool holder 12 and, hence, with respect to the work piece upon which the assembly is operating. Such a selected one of the cutting edge is illustrated at 18' in FIG. 1 in such predetermined cutting position.

The aforementioned mounting means 22 comprises a threaded fastener having a head portion 24 and a threaded portion 26. The threaded portion 26 of the fastener is adjustably axially threadably received in a threaded bore 28 in the tool holder 12. The head portion 24 of the fastener is engageable with a countersunk portion 30 of a bore 32 in the tool body 16. Thus, the fastener may be axially adjustably threadably engaged within the threaded bore 28 of the tool holder such that the head portion 24 of the fastener may engage within the countersunk portion 30 of the tool body 16 with a selectively variable pressure to clamp and hold the tool body 16 against the tool holder 12. In other words, the fastener may relatively tightly clamp or hold the tool body 16 against the tool holder 12 or may be tightened with just "finger-tight pressure." In either event, the fastener is not relied upon to hold a selected one of the cutting edges 18 in the predetermined cutting position 18' thereof, but may assist in doing so. The principal function of the mounting means, particularly including the fastener, is to removably rotatably indexably mount the tool body 16 on the tool holder 12 about a pivot axis defined by the axis of the fastener while permitting sequential indexable movement of the tool body about such pivot axis as will become more apparent hereinafter.

Figure 2:
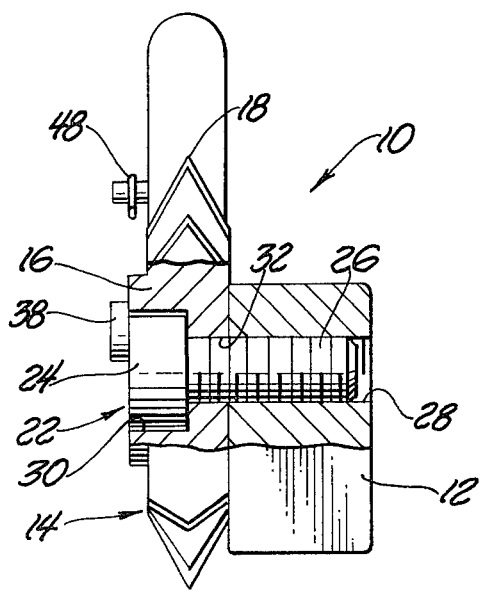
FIG. 2 is a partially broken-away view taken substantially along lines 2—2 of FIG. 1.
Figure 3:
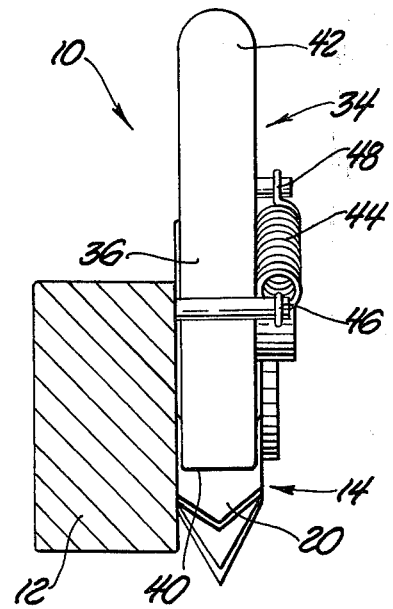
FIG. 3 is a view taken substantially along lines 3—3 of FIG. 1.

A latch means is indicated generally at 34 and comprises a lever 36 suitable operatively pivotally connected at 38 to the tool holder 12 about a second pivot axis spaced from and parallel to the aforementioned pivot axis of the tool body 16. The lever 36 comprises a first end portion 40 operatively engageable and disengageable with a back face portion 30 of a cutting edge 18 remote from the selected one of the cutting edge disposed in the aforementioned predetermined cutting position at 18', and a second end portion 42. The lever end portions 40 and 42 are spaced from each other and disposed on opposite sides of the pivot axis 38. As will be apparent, particularly from FIGS. 2 and 3, the lever 36 is disposed for pivotal movement substantially in the plane of rotation of the tool body 16.

A yieldable spring 44 has its opposite ends respectively operatively fixedly connected by pins at 46 and 48, respectively, to the tool holder and the second portion 42 of the lever 36. The spring 44 functions to continuously urge the tip of the end portion 40 of the latch lever into latching engagement with the back face 20 of a cutting edge 18 remote from the selected one of such cutting edges which is disposed in the aforementioned predetermined cutting position indicated at 18', while the lever end portion 42 is manually engageable to permit manual disengagement of the latch lever from such back face portion while the tool operator manually rotatably indexes the tool body 16 to dispose another selected one of the cutting edges 18 in the predetermined cutting position 18', at which time the lever is released allowing the spring means 44 to re-engage the end portion 40 of the latch lever with the back face of another cutting edge remote from that cutting edge which is in the predetermined cutting position 18'. The latched position of the latch lever 36 is indicated in full lines in FIG. 1 of the drawings, while the unlatched position thereof is indicated in phantom line in such FIGURE of the drawings.

In operation, the mounting means 22 is utilized to rotatably selectively indexably mount the tool body 16 on the tool holder 12 with any degree of clamping pressure desired. In this regard, it is again to be noted that the fastener may be tightly secured to the tool body 12 to tightly clamp the tool body 16 thereagainst, but this clamping pressure, as tight as it might be, does not suffice to hold the cutting tool body in the predetermined cutting position under normal operating conditions. Preferably, the fastener applies "finger tight" clamping pressure against the tool body 16 allowing the tool operator to easily manually index the tool body when desired. Stated another way, in the preferred embodiment, there is no need to untighten the fastener prior to indexing the tool body with respect to the tool holder.

A selected one of the cutting edges 18 is initially disposed in the predetermined cutting position relative to the tool holder means as indicated at 18' and the latch lever 36 is disposed in its full line latched position as illustrated in FIG. 1 of the drawings, thereby locking such selected one of the cutting edges in such predetermined cutting position 18'. The tool is operated against a given work piece until such time as the operating cutting edge becomes sufficiently worn, or perhaps even damaged but, in any event, placed in a condition where it is necessary to have a fresh cutting edge 18 disposed in position 18'. At that time, the tool operator simply manually grasps the end portion 42 of the latch lever 36 to pivot the latter about the pivot axis 38 to move the latch lever to the unlatched phantom line position illustrated in FIG. 1 of the drawings against the force of the spring 44. Thereafter, the tool operator simply manually grasps the tool body 16 to index another one of the cutting edges 18 into the cutting position 18'. The latch lever is then released allowing the lever, under the influence of the spring 44, to reassume the full line latched position of FIG. 1 with the end portion 40 thereof in engagement with the back face portion 20 of another cutting edge remote from the cutting edge disposed in the predetermined cutting position indicated at 18'.

The process is repeated until all of the cutting edges have been used to such an extent that the tool body 16 should be removed from the tool holder for the purpose of resharpening the cutting edges thereof or even, perhaps, disposing of the tool body entirely. In either event, a fresh tool body 16 is mounted on the tool holder to begin cutting operations again.

The invention has been described in an illustrative manner, and it is to be understood that the terminology which has been used is intended to be in the nature of words of description rather than limitation. Many modifications and variations of the present invention are possible in light of the above disclosure. It is, therefore, to be understood that, within the scope of the appended claims, the invention may be practiced otherwise than as specifically described.

The embodiments of the invention in which an exclusive property or privelege is claimed are defined as follows:

1. A cutting tool assembly comprising tool holder means, a cutting tool including a tool body having a plurality of substantially identical cutting edges extending radially from said tool body and being substantially equally circumferentially spaced thereabout, each of said cutting edges having a back face portion, mounting means pivotally mounting said tool body on said tool holder means about a first pivot axis for pivotal indexing movement of said tool body relative to said tool holder means to successively dispose a selected one of said cutting edges in a predetermined cutting position relative to said tool holder means, latch means pivotally mounted on said tool holder means about a second pivot axis spaced from said first pivot axis and having a latched position operatively engageable with said back face portion of a cutting edge remote from said selected one of said cutting edges to hold said selected one of said cutting edges in said predetermined cutting position and an unlatched position permitting pivotal indexable movement of said tool body to dispose another of said cutting edges in said predetermined cutting position, and yieldable means operatively interconnecting said tool holder means with said latch means to continuously urge the latter toward said latched position thereof while permitting movement of said latch means to said unlatched position thereof while indexing said tool body.

2. The invention as defined in claim 1 wherein said mounting means comprises a threaded bore in said tool holder means, and a threaded fastener having a head portion, said fastener being adjustably threadably received in said threaded bore of said tool holder means with said head portion of said fastener in engagement within said tool body to hold said tool body against said tool holder means with a selectively variable pressure.

3. The invention as defined in claim 1 wherein said latch means comprises a lever having first and second end portions spaced from said second axis, said first end portion being operatively engageable with said tool body remote from said selected one of said cutting edges disposed in said predetermined cutting position in said latched position of said latch means, said second end portion of said lever means being manually engageable to move said latch means to said unlatched position thereof.

4. The invention as defined in claim 1 wherein said mounting means comprises a bore in said tool body, said latch means comprises a lever having first and second end portions spaced from said second axis, said first end portion of said lever means being operatively engageable with said tool body remote from said selected one of said cutting edges disposed in said predetermined cutting position in said latched position of said latch means, said second end portion of said lever means being manually engageable to move said latch means to said unlatched position thereof, and wherein said yieldable means comprises a spring means operatively interconnecting said second end portion of said lever and said tool holder means to continuously bias said first end portion of said lever means toward said latched position while permitting movement of said lever means to said unlatched position.

5. A cutting tool assembly comprising tool holder means, a cutting tool including a tool body having a plurality of substantially identical cutting edges extending radially from said tool body and being substantially equally circumferentially spaced thereabout, each of said cutting edges having a back face portion, mounting means pivotally mounting said tool body on said tool holder means about a first pivot axis for pivotal indexing movement of said tool body relative to said tool holder means to successively index and dispose a selected one of said cutting edges in a predetermined cutting position relative to said tool holder means, said mounting means comprising a bore in said tool body and a threaded bore in said tool holder means and a threaded fastener having a head portion, said fastener being adjustably threadably received in said threaded bore of said tool holder means with said head portion of said fastener in engagement with said bore in said tool body to hold said tool body against said tool holder means with a selectively variable pressure, latch means pivotally mounted on said tool holder means about a second pivot axis spaced from and parallel to said first pivot axis and having a latched position operatively engageable with said back face of a cutting edge remote from said selected one of said cutting edges to hold the latter is said predetermined cutting position and an unlatched position permitting manual indexing of said tool body to dispose another of said cutting edges in said predetermined cutting position, said latch means comprising a lever having first and second end portions spaced from said second pivot axis, said first end portion of said lever being engageable with a back face portion of a cutting edge remote from said selected one of said cutting edges disposed in said predetermined cutting position in said latched position of said latch means, and spring means operatively interconnecting said second end portion of said lever and said tool holder means to continuously bias said first end portion of said lever toward said latched position while permitting movement of said lever to said second unlatched position thereby.

* * * * *